United States Patent [19]
Mizukoshi et al.

[11] Patent Number: 5,368,798
[45] Date of Patent: Nov. 29, 1994

[54] METHOD FOR PRODUCING AN IN-MOLD LABELED VESSEL WITH AN ELONGATED BOTTOM PROJECTION

[75] Inventors: Koubu Mizukoshi; Ken Katayama; Masanori Hirata, all of Tokyo; Kohji Maekawa, Saitama, all of Japan

[73] Assignees: Nippla Co., Ltd., Tokyo; Snow Brand Milk Products Co., Ltd., Sapporo, Japan

[21] Appl. No.: 207,262

[22] Filed: Mar. 8, 1994

Related U.S. Application Data

[63] Continuation of Ser. No. 746,726, Aug. 19, 1991, abandoned.

[30] Foreign Application Priority Data

Dec. 28, 1990 [JP] Japan .................. 2-408630

[51] Int. Cl.$^5$ .................. B29C 45/14
[52] U.S. Cl. .................. 264/154; 156/245; 220/633; 264/266; 264/328.1; 264/509; 425/129.1
[58] Field of Search .................. 425/117, 129.1, 503, 425/504, 525, 542; 264/154, 266, 509, 516, 328.1, 328.13; 156/245; 215/1 C; 220/633–636

[56] References Cited

U.S. PATENT DOCUMENTS

| | | | |
|---|---|---|---|
| 3,931,385 | 1/1976 | Sutch | 264/154 |
| 4,076,790 | 2/1978 | Lind | 264/266 |
| 4,140,451 | 2/1979 | Herdzina, Jr. et al. | 264/154 |
| 4,555,381 | 11/1985 | Chazal et al. | 156/245 X |
| 4,605,462 | 8/1986 | Lehner | 156/245 |
| 4,826,641 | 5/1989 | Takeda et al. | 264/328.1 X |
| 4,913,643 | 4/1990 | Shinozawa et al. | 264/509 X |
| 4,952,134 | 8/1990 | Bartley et al. | 425/525 |
| 4,997,356 | 3/1991 | Katagiri | 425/117 |
| 5,009,821 | 4/1991 | Weaver | 264/266 X |

FOREIGN PATENT DOCUMENTS

| | | |
|---|---|---|
| 28912 | 5/1981 | European Pat. Off. . |
| 481090 | 4/1992 | European Pat. Off. . |
| 2046347 | 3/1971 | France . |
| 2210504 | 7/1974 | France . |
| 69371 | 5/1974 | Luxembourg . |
| 638718 | 10/1983 | Switzerland . |
| 2190620 | 11/1987 | United Kingdom . |

*Primary Examiner*—Richard L. Chiesa
*Attorney, Agent, or Firm*—Sandler Greenblum & Bernstein

[57] ABSTRACT

An in-mold labeled vessel with an elongated bottom projection and a method for producing such a vessel is disclosed, wherein a label for in-mold labeling is provided with a bottom portion and side wall portions. Notches are formed in folded portions of the label as connections between the bottom portion and the side wall portions of the label. Alternatively, the label is formed using material and of a predetermined thickness which permit breakage of the label at a particular resin temperature and an internal mold pressure. In order to form an elongated bottom projection integrally with the vessel bottom, the label is loaded into a mold and injection molding is performed, whereby the molding resin which has been injected flows out through the notches or through the broken folded portions into an elongated bottom projection-forming recess formed in the mold.

8 Claims, 2 Drawing Sheets

METHOD FOR PRODUCING AN IN-MOLD LABELED VESSEL WITH AN ELONGATED BOTTOM PROJECTION

This application is a continuation of application Ser. No. 07/746,726, filed Aug. 19, 1991, now abandoned.

BACKGROUND OF THE INVENTION

1. Field of the Invention

The present invention relates to an in-mold labeled vessel with an elongated bottom projection and a method for producing the same.

2. Description of the Prior Art

Heretofore, there have been known a large number of in-mold labeled vessels, but in these conventional vessels, a bottom portion of a label is formed on the vessel bottom and a lower end of a side wall portion of the label, i.e., a bent portion at the connection with the vessel bottom, constitutes, as it is, a part of the vessel bottom, thus resulting in poor looking of the vessel.

The above drawback may be overcome by in-mold labeling a vessel with legs. However, it is difficult to make alignment between the lower end of a side face portion of a label and the leg side portion, and wrinkles are easily formed. Further, resin flows onto the label surface. Moreover, since the vessel is formed with legs, a space portion is formed between adjacent legs in plan or side view, and thus the vessel is unsatisfactory in point of stability and outward appearance.

SUMMARY OF THE INVENTION

The present invention has been accomplished for overcoming the above-mentioned problems, and it is the object of the invention to provide an in-mold labeled vessel having an elongated bottom projection integral with the vessel bottom.

According to the present invention, a label for in-mold labeling is formed into a shape having a bottom portion and side wall portions, and notches are formed in folded portions as connections between the bottom portion and side wall portions. Alternatively, without forming such notches, the label is loaded into a mold for injection molding and then subjected to injection molding, whereby the label is broken at such notched portions or bent portions by the temperature or flow pressure (shear pressure) of resin used, allowing the resin to flow into a recess for an elongated bottom projection formed on a cavity side of the mold to form an elongated bottom projection as an integral part.

DETAILED DESCRIPTION OF A PREFERRED EMBODIMENT

Figure 1:
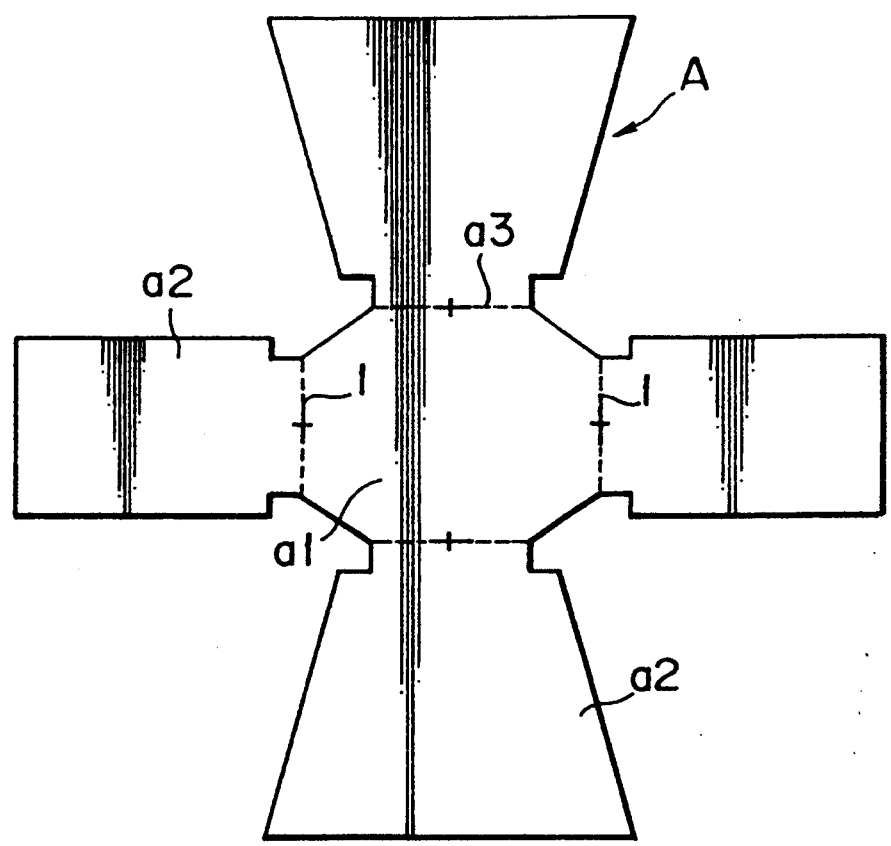
FIG. 1 is a development view of a label.
Figure 2:
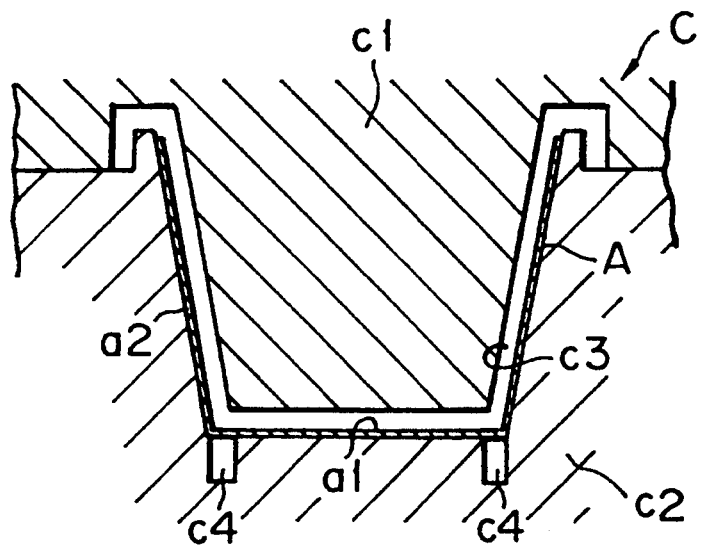
FIG. 2 is a sectional view of a mold for injection molding loaded with the label.
Figure 3:
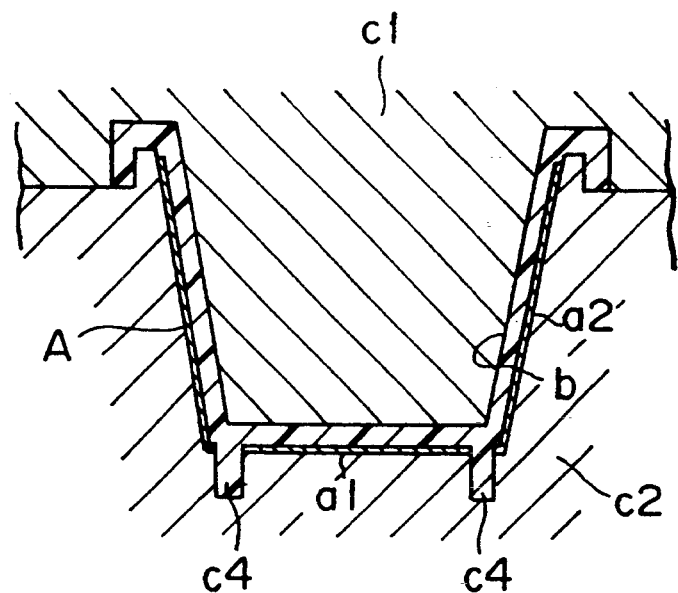
FIG. 3 is a sectional view of the mold with a molding resin injection-molded.
Figure 4:
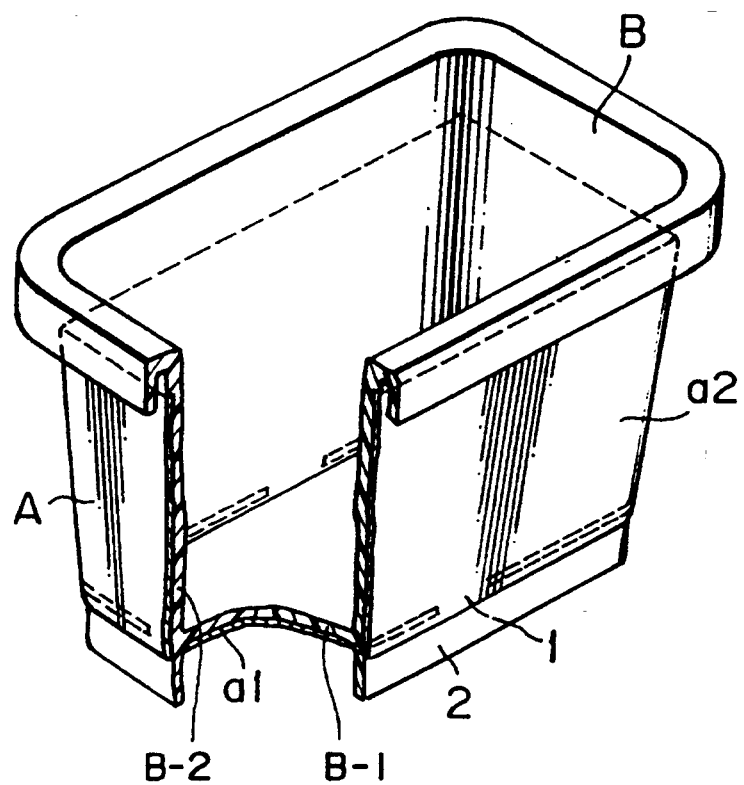
FIG. 4 is a partially cut-away perspective view of a vessel.

An embodiment of the present invention will be described in detail hereinunder with reference to the accompanying drawings.

Label A is formed using an ordinary grade paper, a plastic film, a laminate film, or a material of the same kind as a molding resin used, e.g. a synthetic paper, having a thickness of 60 to 100 microns, and it is cut into a predetermined development form (a two- or four-directional label) so as to be in-molded on the surface of a vessel B. The label A, having a predetermined print thereon, comprises a bottom portion a1 and side wall portions a2 positioned on the bottom and side walls, respectively, of the vessel, and a suitable number of notches 1 are formed in folded portions a3 as connections between the bottom portion a1 and the side wall portions a2. In the case where the label A is constituted by material of the same kind as a molding resin, e.g. synthetic paper, or when the label has a thickness which causes breakage of the label at a resin temperature and at a flow pressure (shear pressure) of the resin, the notches may sometimes be omitted.

The label A having such construction is loaded into a mold C for injection molding, and a molding resin b is injected into the mold at a melt temperature of 190°–200° C. and an internal pressure of 300–600 kg/cm$^2$.

The mold C is for injection molding, having form and construction known in this technical field. It is divided into a core c1 side and a cavity c2 side, and the molding resin b for the vessel B is injected into a space c3 formed between c1 and c2. A recess c4 for the formation of an elongated bottom projection is formed circumferentially on the cavity c2 side. The label A is loaded into the space c3 by vacuum suction and brought into abutment with the inner surface of the cavity c2, then the molding resin b is injected into the space. The injection of the resin b may be done from either the cavity side or the core side, but when it is done from the cavity side, a resin inlet hole (not shown) is formed in the bottom portion a1 of the label A.

As the molding resin b there is used a soft or hard synthetic resin, e.g. polypropylene (PP), polystyrene (PS), polyethylene terephthalate (PET), a commonly known polyester, or polyethylene (PE). Using such molding resin, there can be molded a transparent, translucent or opaque vessel B, and the label A is in-molded on the outer surface of such vessel B.

The vessel B is formed by injection molding in which the molding resin b in a molten condition is injected into both the space c3 and the elongated bottom projection forming recess c4 of the injection molding mold C. To the bottom B-1 and peripheral side B-2 of the vessel B there are integrally bonded the bottom portion a1 and side wall portions a2, respectively, of the label A. Further, an elongated bottom projection 2 is formed throughout the whole circumference of the bottom B-1 at a predetermined height by the resin which has been injected into the recess c4 of the mold C. The vessel B has a desired three-dimensional shape such as a polygonal shape, e.g. square, rectangular or hexagonal shape, or a circular or elliptical shape. It may have flat and curved surfaces.

The elongated bottom projection 2 may extend on the same plane as the peripheral side B-2, or it may be in a somewhat inside position of the bottom B-1, and the elongated bottom projection forming recess c4 is formed accordingly on the cavity c2 side of the mold C.

For forming the elongated bottom projection 2, the molding resin b is injected in a molten condition into the mold C in a loaded state therein of the label A, so that the resin flows into the recess c4 through notches 1 formed in the folded portions a3 as connections between the bottom portion a1 and the side wall portions a2 of the label A. Therefore, the notches a4 may be formed in all of the folded portions a3, or several such notches may be formed in suitable positions. In the case where the label A is formed using a material of the same kind as the molding resin, e.g. synthetic paper, or when it is formed using material and thickness which permit breakage at a resin temperature and at a flow pressure (shear pressure) of the resin, the folded portions a3 are partially broken by the injection pressure of the molten resin even without forming notches, so that the resin flows into the recess c4 and when solidified the resin in each broken portion serves as an adhesive or the broken portion is filled with the resin.

According to the vessel and producing method for same of the present invention, a label for in-mold labeling is formed to have a bottom portion and side wall portions, and in injection molding of a molding resin after loading the label into a mold for injection molding, notches are formed in folded portions as connections between the label bottom portion and side wall portions, or the label is formed using a material of the same kind as the molding resin, e.g. synthetic paper, or it is formed to have a thickness which permits breakage of the label at a resin temperature and at a flow pressure (shear pressure) of the resin, followed by injection molding, with the result that the molding resin flows out into an elongated bottom projection forming recess formed in the mold through the notches or while breaking the folded portions, thereby forming an elongated bottom projection integrally with the vessel bottom. Therefore, the entire vessel height increases by an amount corresponding to the height of the elongated bottom projection, thus affording a very good outward appearance, and hence the vessel is of great commercial value.

Moreover, if the color of the molding resin and that of the label are made alike, the boundary between the label and the elongated bottom projection becomes indistinct, whereby the entire vessel can be seen larger than the actual size thereof and the positioning of the label into a mold can be done more easily than in the conventional construction with legs. There is no fear of wrinkling or flowing of a molding resin onto the label surface. Besides, since an elongated bottom projection is formed throughout the whole circumference without formation of a space portion in the front or side faces, the vessel obtained is stable and its outward appearance is further improved.

Moreover, since a molding resin which has been injected into a mold flows easily into an elongated bottom projection forming recess of the mold through notches formed in folded portions, the surface finish is good and there will be no defect of the resin portion.

Further, if the label for in-mold labeling is formed using a material of the same kind as a molding resin, e.g. synthetic paper, or if it is formed to have a thickness which permits breakage of the label at a resin temperature or at a flow pressure (shear pressure) of the resin, part of each folded portion will be broken by an injection pressure of the resin even without forming the foregoing notches (although the notches may be formed, of course), resulting in that the resin flows through the broken part into the elongated bottom projection forming recess, thus also permitting easy molding.

What is claimed is:

1. A method for producing an in-mold labeled vessel with an elongated bottom projection, comprising the steps of:

providing a label having a bottom portion with a plurality of foldable side wall portions and a plurality of folded portions connecting said bottom portion with said side wall portions, said label having a thickness substantially between 60 and 100 microns and being formed from material selected from the group consisting of ordinary grade paper, plastic film, laminate film and synthetic paper, said label comprising at least one frangible portion for allowing breakage of said label due to a predetermined resin temperature and an internal mold pressure;

loading said label into a mold formed with an elongated bottom projection forming recess; and injecting a molding resin into said mold at a resin temperature substantially between 190° and 200° C. and at an internal mold pressure substantially between 300 and 600 kg/cm$^2$, said resin temperature and said internal mold pressure producing said breakage of said label at said at least one frangible portion, said molding resin flowing through said at least one broken frangible portion of said label and into said recess to form the elongated bottom portion of said vessel.

2. A method for producing an in-mold labeled vessel according to claim 1, wherein the step of loading said label into said mold includes loading said label into said mold by vacuum suction.

3. A method for producing an in-mold labeled vessel according to claim 1, wherein the step of providing a label includes providing said folded portions with a plurality of said frangible portions.

4. A method for producing an in-mold labeled vessel according to claim 1, wherein said molding resin is selected from the group consisting of polypropylene (PP), polystyrene (PS), polyethylene terephthalate (PET), and polyethylene (PT).

5. A method for producing an in-mold labeled vessel according to claim 1, wherein said label is formed from a material that is the same as that used for said molding resin.

6. A method for producing an in-mold labeled vessel according to claim 1, wherein the step of providing a label includes providing said frangible portion in an area of said label that is adjacent to said recess when said label is loaded into said mold.

7. A method for producing an in-mold labeled vessel according to claim 6, wherein said mold comprises a plurality of side wall portions and a bottom portion, said recess being formed in a plane forming an extension of at least one of said side wall portions.

8. A method for producing an in-mold labeled vessel according to claim 6, wherein said mold comprises a plurality of side wall portions and a bottom portion, said recess being formed inwardly of said side wall portions and of a peripheral edge of said bottom portion.

* * * * *

UNITED STATES PATENT AND TRADEMARK OFFICE
CERTIFICATE OF CORRECTION

PATENT NO. : 5,368,798
DATED : November 29, 1994
INVENTOR(S) : Koubu MIZUKOSHI et al.

It is certified that error appears in the above-indentified patent and that said Letters Patent is hereby corrected as shown below:

At column 4, line 5 (claim 1, line 2), change "with-an" to ---with an---.

Signed and Sealed this

Twenty-second Day of August, 1995

Attest:

BRUCE LEHMAN

Attesting Officer

Commissioner of Patents and Trademarks